United States Patent

Toida et al.

[11] Patent Number: 5,153,977
[45] Date of Patent: Oct. 13, 1992

[54] METHOD FOR MAKING DOUBLE-WALLED INSULATING METAL CONTAINER

[75] Inventors: Shouji Toida; Shigeru Tsuchiya; Keiki Ariga; Seiichi Itoh; Hidetoshi Ohta, all of Tokyo, Japan

[73] Assignee: Nippon Sanso Corporation, Tokyo, Japan

[21] Appl. No.: 649,484

[22] Filed: Feb. 1, 1991

[51] Int. Cl.$^5$ ............................................. B23P 19/04
[52] U.S. Cl. ................................... 29/455.1; 29/422; 228/176
[58] Field of Search ............... 29/422, 455.1, 773, 29/778, 801, 460; 53/399, 440; 215/12.1, 12.2; 220/420–424, 456; 228/176, 184

[56] References Cited

U.S. PATENT DOCUMENTS 4,157,779  6/1979  Ishii et al. ............... 29/455.1 X

FOREIGN PATENT DOCUMENTS 60-36766  8/1985  Japan .

Primary Examiner—Joseph M. Gorski
Assistant Examiner—Peter Dungba Vo
Attorney, Agent, or Firm—Scully, Scott, Murphy & Presser

[57] ABSTRACT

This invention relates to a method of making a double-walled thermally insulating metal container comprising an inner casing and an outer casing having an evacuation opening. A quantity of joining material is placed near or on the evacuation opening so as to cover the opening partially or completely. The assembly is treated in a vacuum furnace to evacuate the insulating space, to melt the joining material and to solidify the joining material in situ to provide vacuum sealing without resorting to a conventional sealing plate.

7 Claims, 22 Drawing Sheets

FIG.11
FIG.11a
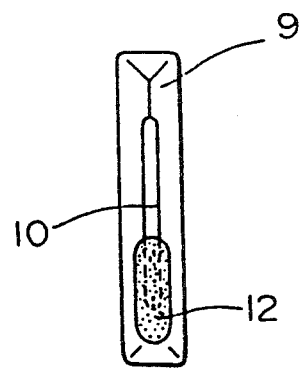
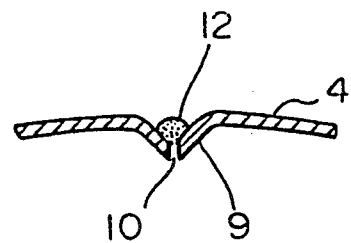

METHOD FOR MAKING DOUBLE-WALLED INSULATING METAL CONTAINER

FIELD OF THE INVENTION

This invention relates to a method of manufacturing a double-walled thermally insulating metal container by processing in a vacuum heat treating furnace.

BACKGROUND OF THE INVENTION

Thermally insulated metal containers, commonly known as thermos or vacuum bottles, are constructed of an inner and an outer metal casings to create a double-walled space therebetween and evacuating the space to create a thermal insulation barrier. A method for making such thermos bottles has been disclosed in a Japanese patent, JPN 60-36766 (Kokoku). According to this patented method, a thermos bottle shown in FIG. 28 consists of an inner casing 1 and an outer casing 2 having a bottom, to create a space 3 therebetween to be evacuated for thermal insulation. A thermos bottle can be made from such a structure by joining a reduced diameter section 4a, of the body section 4 of the outer casing 2, to the mouth section 1a of the inner casing 1. To the bottom opening 5 (shown at the top in FIG. 28) is attached a bottom section 6 to complete the construction of a container assembly of the thermos bottle. There is a stepped section 6a in the center area of the bottom section 6, and there is an evacuation opening 7 in the central region of the stepped section 6a. This opening 7 is brazed shut with a sealing plate 8 after evacuation of the space 3 to seal in the vacuum.

This vacuum sealing operation is performed by inverting the bottle as shown in FIG. 28, placing pieces of brazing material around the stepped section 6a, supporting the sealing plate 8 to provide a space between it and the stepped section 6a, evacuating followed by heating so as to evacuate space 3 and melt the brazing material to allow the sealing plate 8 to drop under its own weight to braze shut the evacuation opening 7.

This method of joining was susceptible to sealing defects produced by the dislocation of brazing material and the sealing plate 8 prior to brazing due to rushing air streams at the evacuation opening 7 through the space (between it and the stepped section 6a) as well as by the uncontrolled flowing of the brazing material around the peripheries of the stepped section 6a during brazing.

In addition, it was difficult to automate the placement of the brazing material properly, necessitating a manual operation. Furthermore, the sealing plate was necessary only to provide sealing of the evacuation opening 7. These were two of the main reasons for increasing the cost of production of metal thermos bottles.

SUMMARY OF THE PRESENT INVENTION

The objective of the present invention is to provide a method of defect-free sealing; a method of sealing without a sealing plate; and a method of automating the process of making metal thermos bottles so as to permit economical production of metal thermos bottles.

The method of making a metal thermos bottle in the present invention comprises the steps of preparing an inner and an outer metal casings, joining them at a mouth section to form a double-walled structure, positioning a brazing metal on, or in such a way to partially cover, an opening provided on said outer casing, and with said opening facing upward, subjecting said double-walled assembly to vacuum brazing so that said brazing metal would flow onto said opening to provide the vacuum sealing.

The invented method improves manufacturing efficiency greatly because the positioning of the double-walled structure and the placement of the brazing metal on or about the opening are chosen so that evacuation is carried out through the opening and subsequent heating permits the brazing metal to flow onto said opening and to be held in place by liquid surface tension forces until allowed to solidify, thus providing an effective sealing of the evacuation opening without the use of a sealing plate. Furthermore, vacuum melting allows degassing of the molten braze, thus permitting the production of void-free brazed joints of high structural integrity. The seal made by such a method is more apt to be leak proof. Further, the invented procedure can be automated easily to lead to greatly increased productivity because placing of the brazing metal is not critical.

BRIEF DESCRIPTION OF THE DRAWINGS

FIGS. 10, 11 and 11a are schematic drawings to show the structural features of the metal thermos bottle in a fifth preferred embodiment of claim 1.

DETAILED DESCRIPTION OF THE PREFERRED EMBODIMENTS OF THE PRESENT INVENTION

The present invention is explained in reference to the drawings.

Figure 1:
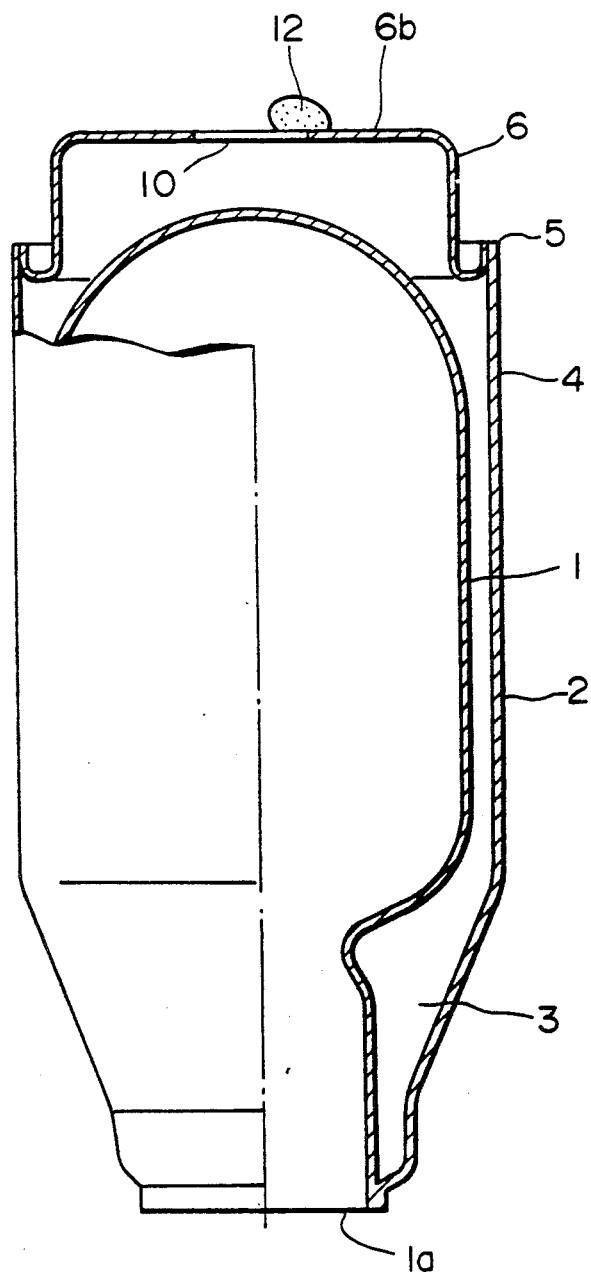
FIGS. 1 and 2 are schematic drawings to show the structural features of the metal thermos bottle in a first preferred embodiment of claim 1.
Figure 2:
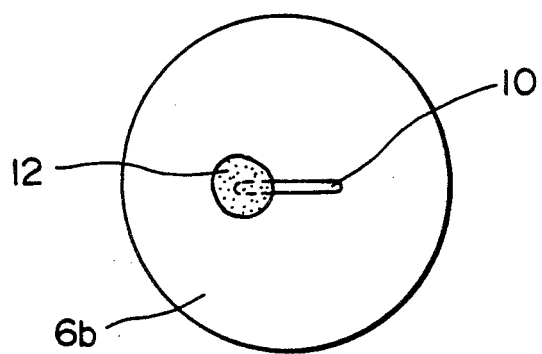

FIGS. 1 and 2 show manufacturing of metal thermos bottles according to a first preferred embodiment. FIG. 1 shows the bottle assembly before vacuum sealing. A double-walled structure is comprised of an inner cylindrical metal casing 1 with a bottom part, and an outer cylindrical metal casing 2, wherein the narrow diameter upper portion of the inner casing is joined to the upper portion of the body section 4 of the outer casing 2 to form a mouth section 1a. The round bottom opening portion 5 of the outer casing 2 is fitted with a bottom section 6 to form the basic assembly of a double-walled thermos bottle. In order to evacuate and seal this thermos bottle according to this invention requires the presence of an opening of a slit 10 at the central area 6b of the bottom section 6, and a placement of the assembly in an inverted position with the mouth opening at the bottom and the bottom section at the top as shown in FIGS. 1. A small bead of brazing paste 12 is placed in such a way to partially cover the silt 10 as shown in FIG. 2. If the size of the opening of the slit 10 is too small, the evacuation time becomes too long while if it is too large, the surface tension force of the liquid braze is insufficient to hold the liquid paste on the top surface of the slit; therefore, an optimum slit size is between 0.1 to 2.0 mm. As for the brazing metal, those which are not volatile at the brazing temperatures, such as Ni-, Ag-, Cu-, Au-, Al-, Ti- and P-based materials are preferred. In order to produce a brazed thermos bottle, the inverted assembly, i.e. the central area 6b of the bottom section 6 facing upward, is placed in a vacuum heating furnace, and the assembly is subjected to evacuation and heating processes, to remove the air from the space 3 between the inner casing 1 and the outer casing 2 through the slit 10. When the brazing temperature is reached, the brazing paste 12 becomes liquid, and the liquid surface tension force is able to hold the molten bead on top of the slit 10 until the cooling cycle begins and the liquid braze turns to a solid to close off the opening of the slit 10.

According to the above described procedure, it is possible to evacuate the space 3 of a thermos bottle without using the sealing plate 8. Additionally, by placing a getter material (to capture intruding gaseous substances) in this space 3, it is possible to maintain original vacuum for a prolonged period of time, and to retain the original insulative qualities.

Figure 3:
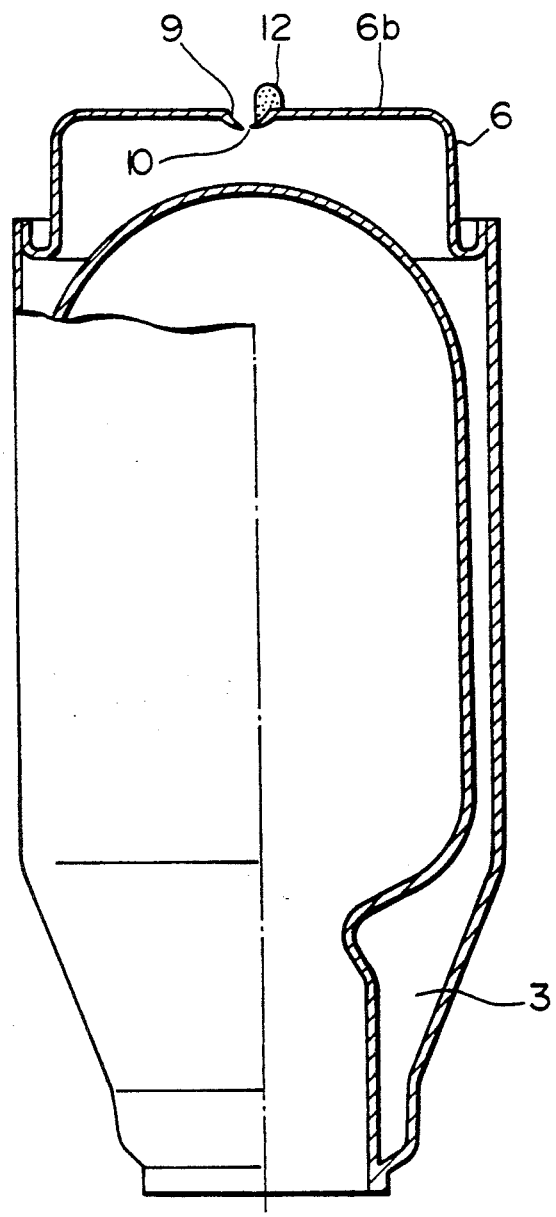
FIGS. 3 to 5 are schematic drawings to show the structural features of the metal thermos bottle in a second preferred embodiment of claim 1.
Figure 4:
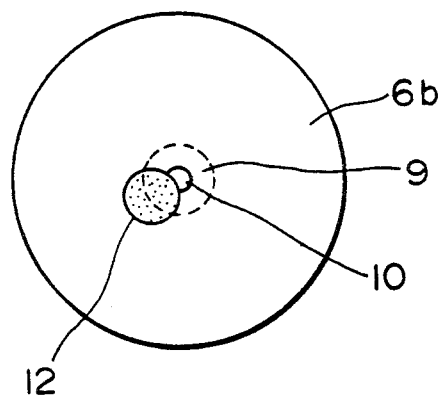
Figure 5:
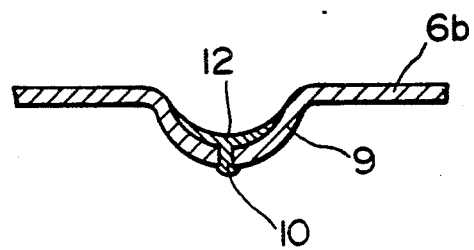

FIGS. 3 to 5 show a second preferred embodiment of the present invention. As shown in FIGS. 3 and 4, a circular evacuation opening 10 is provided in the central area of a semi-spherical depression 9 (depressed in the direction of the space 3), disposed on the central area 6b of the bottom section 6. A sufficient mound of brazing paste 12 is placed on top of the opening 10, as shown in FIG. 4, in such a way as to be contained within the depression 9 but not cover the opening 10 completely. The inverted thermos assembly is placed in the vacuum heating furnace, the air inside the space 3 is evacuated through the opening 10, the braze is melted and is retained on the opening 10 by the surface tension force and the opening is sealed upon solidification of the molten braze, as shown in FIG. 5.

Figure 6:
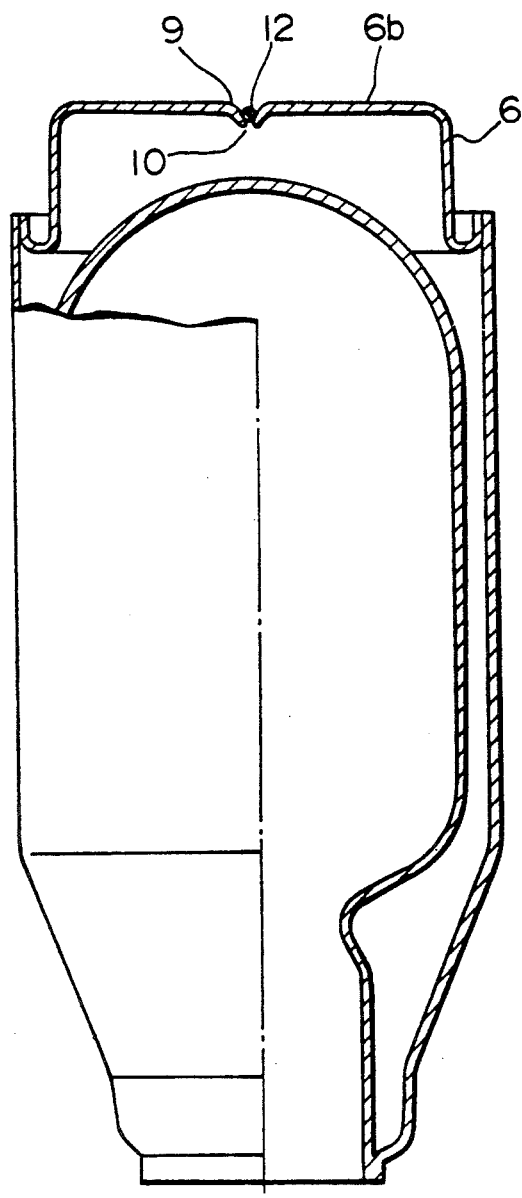
FIGS. 6 and 7 are schematic drawings to show the structural features of the metal thermos bottle in a third preferred embodiment of claim 1.
Figure 7:
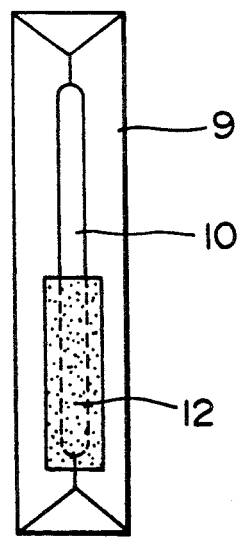

FIGS. 6 and 7 show a third preferred embodiment of the present invention.

FIG. 6 shows the arrangement of the same basic components as were shown in FIG. 1, but the cutout has been replaced with a rectangular-shaped channel 10 formed in the deepest spot of the depression 9 disposed in the central area 6b of the bottom section 6. A short length of brazing metal 12, shorter than the length of the opening of the rectangular-shaped slit 10, is placed on the slit as shown in FIG. 7. The inverted thermos assembly is placed in the vacuum heating furnace, the air inside the space 3 is evacuated through the opening 10, the braze is melted and is retained on the opening 10 by the surface tension force and the opening is sealed upon solidification of the molten braze.

Figure 8:
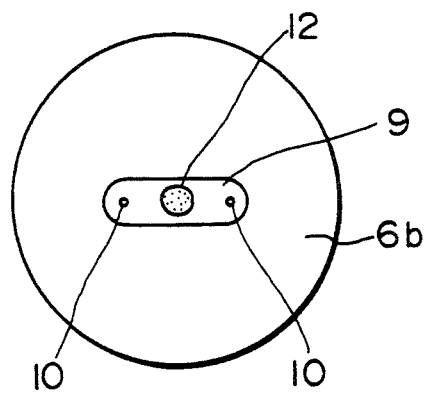
FIGS. 8 and 9 are schematic drawings to show the structural features of the metal thermos bottle in a fourth preferred embodiment of claim 1.
Figure 9:
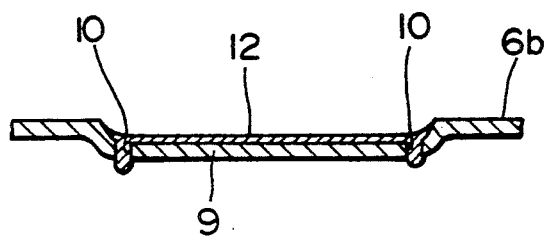

FIGS. 8 and 9 show a fourth preferred embodiment of the present invention.

FIG. 8 shows the arrangement of the same basic components as were shown in FIG. 1, but the cutout has been replaced with an elongated rectangular channel 9 (depressed in the direction of the space 3) disposed in the central area 6b of the bottom section 6. Two small evacuation holes 10 are disposed in the lengthwise direction on this channel 9, as shown in FIG. 8, and a mound of grains of brazing metal 12 is placed on the channel so as not to cover each of the holes. The inverted thermos assembly is placed in the vacuum heating furnace the air inside the space 3 is evacuated through the holes 10, the braze is melted and is retained on the holes 10 by the surface tension force and the holes are sealed upon solidification of the molten braze. FIG. 9 shows the central area 6b after the holes 10 have been sealed by brazing metal 12.

Figure 10:
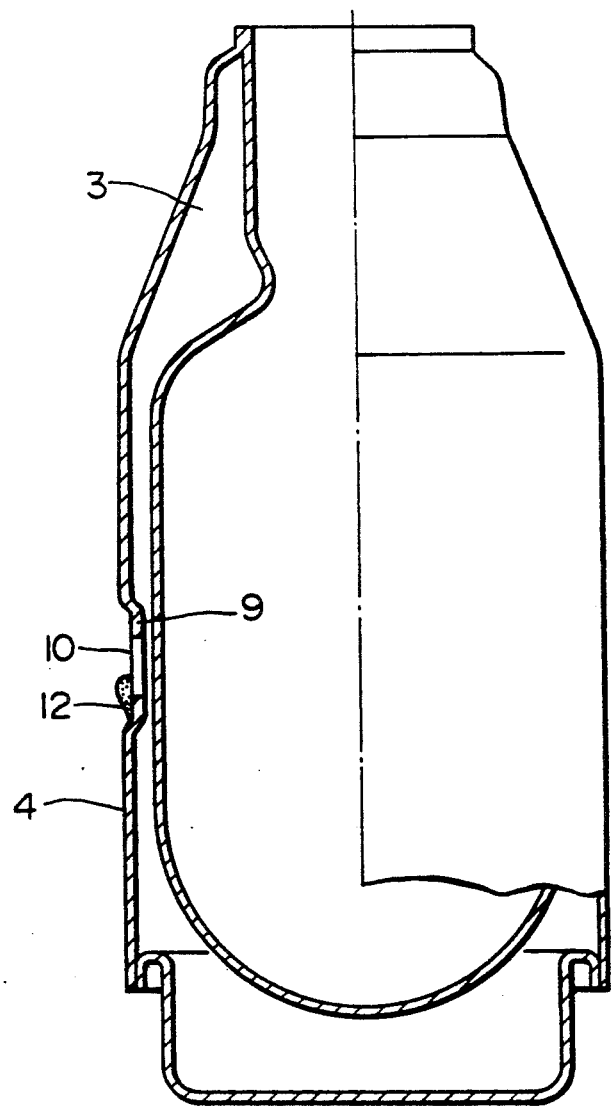

FIG. 10, 11 and 11a show a fifth preferred embodiment of the present invention.

FIG. 10 shows the arrangement of the same basic components as were shown in FIG. 1, but instead of the cutout, a vertical slit 10 is disposed at the bottom area of a V-shaped depression 9 (depressed in the direction of the space 3) provided on the body section 4 of the outer casing 2, and a bead of brazing paste 12 is place on the slit to partially cover it. Their relative positions are illustrated in FIGS. 11 and 11a. The assembly is placed in the vacuum heating furnace so that the slit opening faces upward, the air inside the space 3 is evacuated through the slit 10, the braze is melted and is retained on the slit 10 by the surface tension force and the slit is sealed upon solidification of the molten braze.

Figure 12:
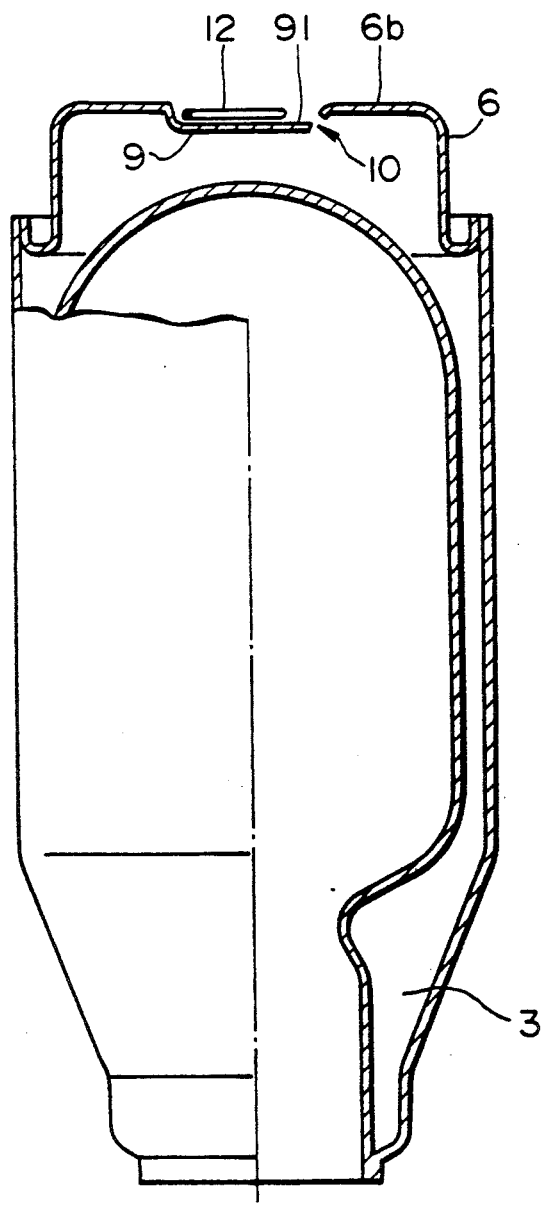
FIG. 12 is a schematic drawing to show the structural features of the metal thermos bottle in a sixth preferred embodiment of claim 1.

FIG. 12 shows a sixth preferred embodiment of the present invention.

FIG. 12 shows the arrangement of the same basic components as were shown in FIG. 1, but instead of the cutout, a circular evacuation opening 10 is provided in a depression 9 (depressed in the direction of the space 3), disposed on the central area 6b of the bottom section 6. An evacuation opening 10 is disposed on the outer periphery of the curved section 91 of the depression 9, and on an inverted thermos assembly a curved brazing wire 12 is placed so as to partially cover the opening 10. Evacuation and heating are carried out as before in the inverted position.

Figure 13:
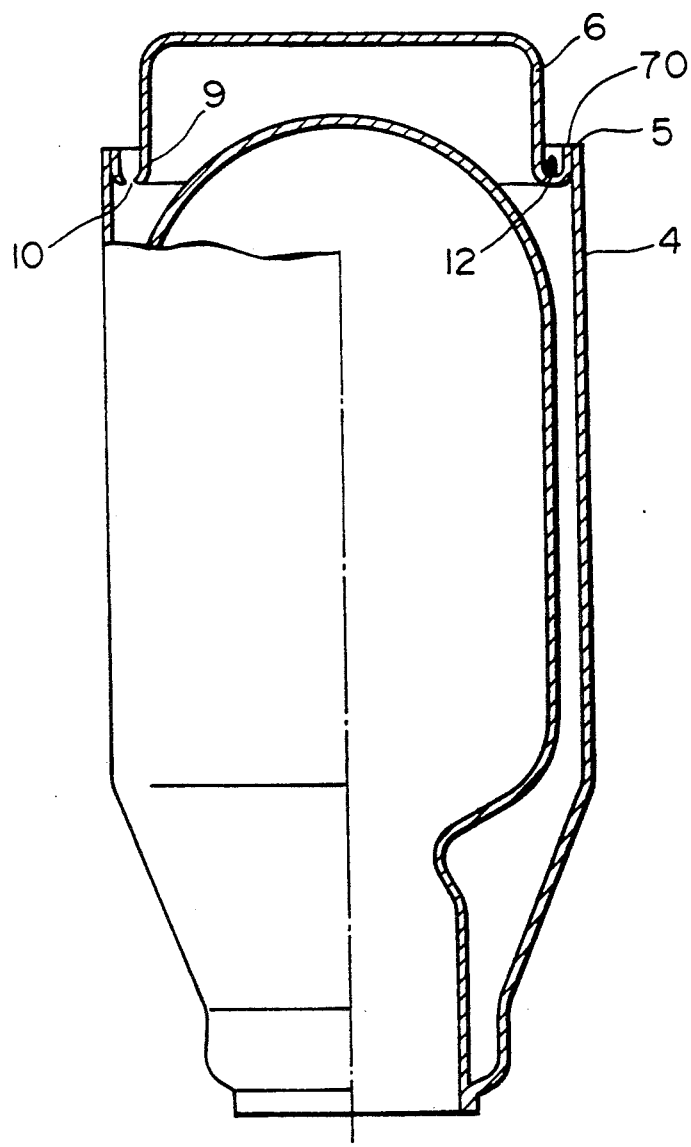
FIG. 13 is a schematic drawing to show the structural features of the metal thermos bottle in a seventh preferred embodiment of claim 1.

FIG. 13 shows a seventh preferred embodiment of the present invention.

FIG. 13 shows the arrangement of the same basic components as were shown in FIG. 1, but instead of the cutout, a circular evacuating opening 10 is provided near the peripheral area of a joint section 70 where the bottom section 6 is attached internally to the bottom opening portion 5 of the body section 4 of the outer casing 2. A piece of brazing ring 12 is placed on the opening 10 of an inverted assembly and brazed as before in the vacuum heating furnace.

The method of making thermos bottles according to the shape of the evacuation opening is not restricted to the examples given above.

Further, the form of brazing metal used in the manufacturing of the thermos bottles is not restricted to the above examples, and powder or plate form can also be used.

Further, in addition to the bottom section 6 and the body section 4, the evacuation opening 10 of the outer casing 2 can be placed almost anywhere, excepting the mouth section 1a, including the shoulder section.

Further, it is not necessary that the evacuation opening be located only on a planar part, and a stepped part may also be satisfactory.

In the above examples, brazing metal was used alone. A useful variation is a composite brazing material, in which a powdery material having a higher melting point than the brazing metal, such as stainless steels and carbon steels, are added to the brazing metal to obtain a composite brazing material. The composite brazing material is able to remain on openings of large dimensions without dropping through thus permitting the use of a large evacuation opening, facilitating evacuation and ultimately leading to lower production cost.

Further, there is no limitation regarding the suitable stage of fabricating the evacuation opening, it can be made before or after the joining of the inner and outer casings.

Further, the method of claim 2 relates to the method as claimed in claim 4, in which a depression is created on the outer casing, and an evacuation opening is provided in the central area of this opening.

According to this method, the molten brazing material can flow into the opening readily because the opening is provided at the bottom area of a depression.

A system of combining a binder and a brazing metal, forming a special compounded brazing material, can be applied to making of double-wall metal thermos bottles (claim 3). According to this method, a thermos assembly consisting of a double wall container, joined at the mouth section 1a to create an insulating space, and having an evacuation opening provided on an outer casing, is sealed with the compounded brazing material consisting of a binder and a brazing metal. This compounded brazing material functions as follows. The compounded brazing material is placed on the evacuation opening so as to completely cover the opening, and the assembly is heated, in a vacuum heating furnace, to temperatures above the vaporization temperature of the binder, but below the melting temperature of the brazing metal. Evacuation is completed at this temperature and the assembly is next heated to above the melting temperature of the brazing metal.

When a temperature is reached at which the binder evaporates, a porous braze body is left behind through which evacuation of the space continues to take place. After the evacuation of the space has been completed, the temperature is raised to first melt and then to solidify the brazing metal in situ to seal off the opening.

Figure 14:
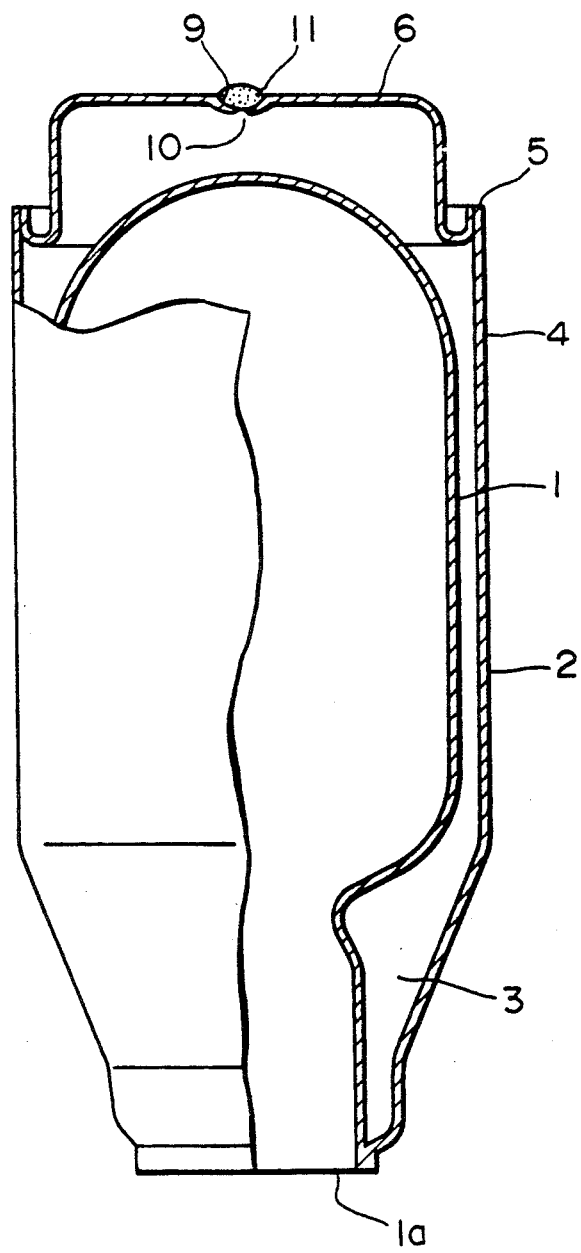
FIG. 14 is a schematic drawing to show the structural features of the metal thermos bottle in a first preferred embodiment of claim 3.
Figure 15:
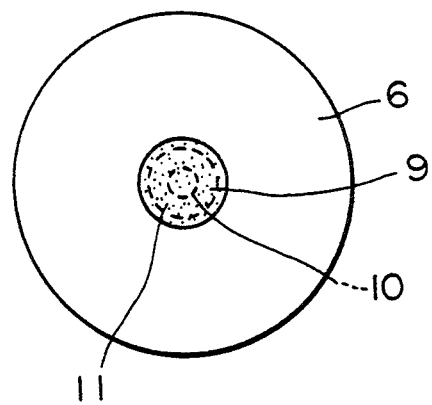
FIG. 15 shows an enlarged view of a depressed section and an evacuation opening of a thermos bottle shown in FIG. 14.
Figure 16:
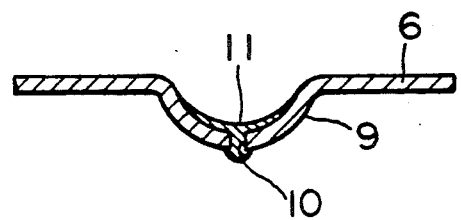
FIG. 16 shows an enlarged view of the sealed evacuation opening shown in FIG. 14.

FIGS. 14 to 16 relate to the first preferred embodiment of claim 3 of the present invention.

FIG. 14 to 15 show the thermos bottle assembly before vacuum sealing, and FIG. 15 is an enlarged view of the main features of the evacuation opening 10. The method shown in FIGS. 14 and 15 differs from that shown in FIGS. 3 and 4 in the placement of the brazing material: previously the brazing metal was placed partially over the opening (disposed in the central area 6b of the bottom section 6) but in this example, it is placed in such a way to completely cover the opening, disposed identically to the earlier example.

According to this method of evacuating and sealing a thermos bottle, an evacuation opening 10 is disposed in a semi-spherical depression 9, which is depressed toward the evacuation space 3. The assembly is inverted, and a mound of compounded binder 11, which consists of brazing metal particles mixed with a binder, is placed to cover the opening. The inverted assembly is placed in a vacuum heating furnace and heated progressively to vaporize the binder from the brazing material 11 and ultimately to melt the brazing metal 11 and seal off the opening 10.

The detailed processing steps consists of a two stage process of: evacuating and heating the assembly to a temperature to vaporize the binder (300° to 600° C.) but not to melt the brazing metal; and melting the brazing metal to seal the opening at a temperature beyond the melting temperature of the brazing metal (100° C.).

During the first stage of evacuating and heating between 300° to 600° C., the binder in the compounded brazing material 11 is evaporated to leave behind a porous brazing body through which evacuation of the space 3 is continued.

After thoroughly evacuating the space 3 under the above-described condition, the heating is resumed until the compounded brazing material 11 is melted. At this stage of processing, the molten braze is held in the opening by its liquid surface tension forces and penetrates into the opening 10 by the capillary action to seal off the opening 10 completely. Since the melting is carried out in a vacuum, degassing can take place to form a brazed joint of improved structural integrity.

Regarding an optimum size of the opening 10, a range of 0.1 to 2.0 mm is considered an optimum; if it is larger, surface tension forces are insufficient to retain the liquid on the opening while if it is smaller, the evacuation operation becomes inefficient.

Regarding the quality of the compounded brazing material 11, it consists substantially of a binder and a metal brazing metal, containing non-volatile metal components such as Ni-, Ag-, Cu-, Sn-, Al-, Ti- and P-based material in a powder or particulate form. Further, by adding to the compounded brazing material 11, metal powders or flakes having a higher melting temperature than the brazing metal component, it becomes possible to enlarge the evacuation opening 10, resulting in improved fabricability and yield of producing the opening 10. Larger openings contribute further to lowering of the production cost, because the evacuation process is shortened and less brazing material 11 is needed to seal the opening 10 effectively.

The choice of the binder material is not particularly limited so long as it is an organic-based material which can melt below the melting point of the brazing metal, preferably in a range of 300° to 600° C. For example, starch treated with an acid or an alkaline substance, and an emulsion of styrene/vinyl copolymer are all potential binder materials.

According to the above described procedure, it is possible to evacuate the space 3 of a thermos bottle without using the sealing plate 8. Additionally, by placing a getter material (to capture intruding gaseous substances) in this space 3, it is possible to maintain original vacuum for a prolonged period of time, and to retain the original insulative qualities.

Figure 17:
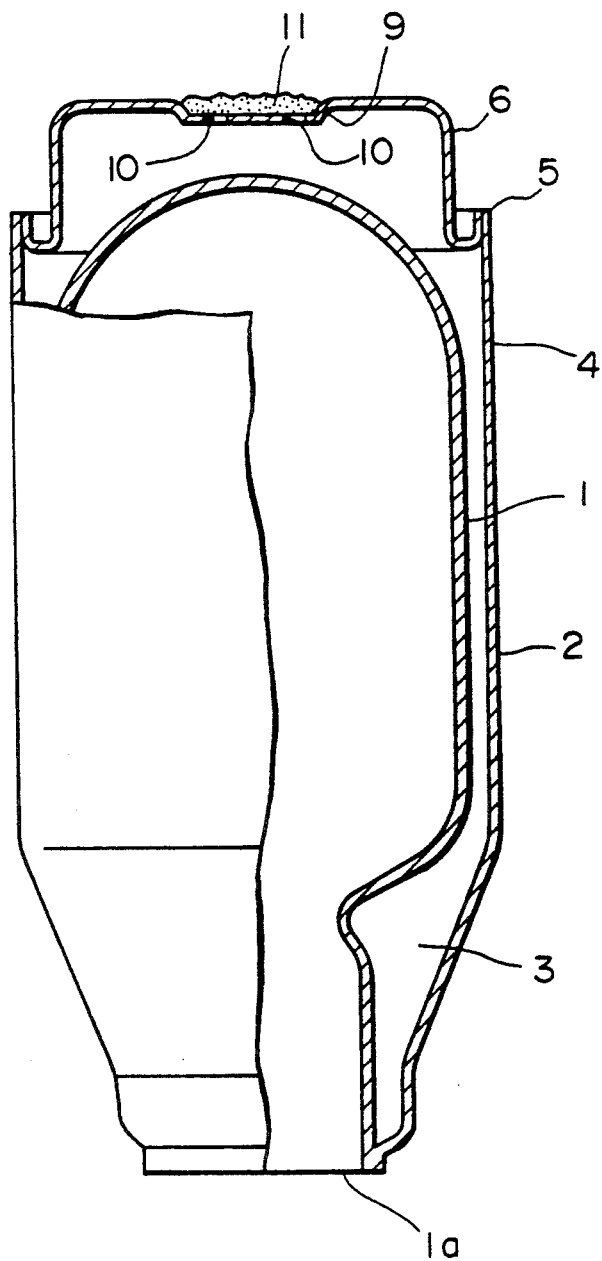
FIG. 17 is a schematic drawing to show the structural features of the metal thermos bottle in a second preferred embodiment of claim 3.
Figure 18:
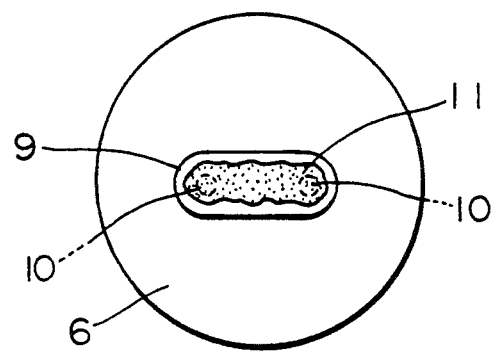
FIGS. 18 and 19 are enlarged views of the depressed section and the evacuation opening shown in FIG. 17.
Figure 19:
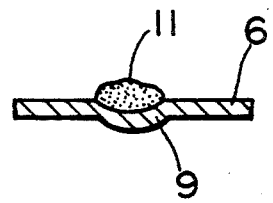
Figure 20:
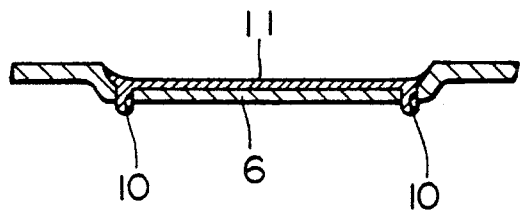
FIG. 20 shows the sealed evacuation openings of the metal thermos bottle shown in FIG. 17.

FIGS. 17 to 19 relate to the second preferred embodiment of the present invention, before vacuum sealing, and FIGS. 18 and 19 are enlarged views of the sealing arrangement shown in FIG. 17, and FIG. 20 shows the seal after it has been brazed shut.

This case differs from that shown in FIGS. 14 to 16 in the number of evacuation openings. This case shows, as in FIGS. 17 to 19, two openings 10 located at the bottom ends of a channel-shaped depression 9 disposed in a central area of the bottom section 6. By providing a multiple of such evacuation openings, it becomes possible to speed up evacuation of the space 3, without enlarging the size of each opening.

It should be obvious that the number of such openings 10 are not restricted to two as in this example, but any number of openings can be provided lengthwise along the channel 9.

Figure 21:
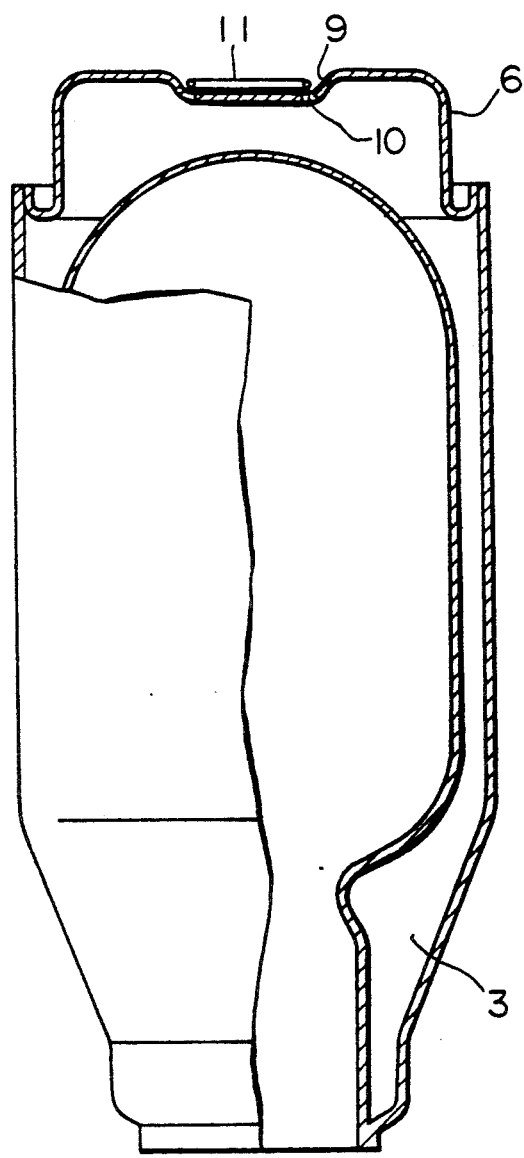
FIG. 21 is a schematic drawing to show the structural features of the metal thermos bottle in a third preferred embodiment of claim 3.
Figure 22:
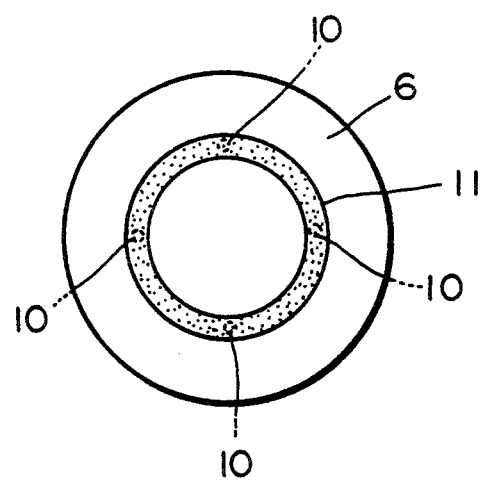
FIG. 22 shows an enlarged view of the depressed section and the evacuation opening shown in FIG. 21.

FIGS. 21 and 22 relate to the third preferred embodiment of claim 3 of the present invention, before vacuum sealing. This case differs from that shown in FIGS. 14 to 16 in the size of the depression 9, which is larger than that shown previously, disposed in the central area of the bottom section 6. Within this circular-shaped depression is a series of evacuation openings 10 in a concentric circle, along which is placed a line of brazing material 11 to cover the openings 10. According to this arrangement, it is possible to speed up evacuation of the space 3, and the amount of brazing metal can also be reduced.

Figure 23:
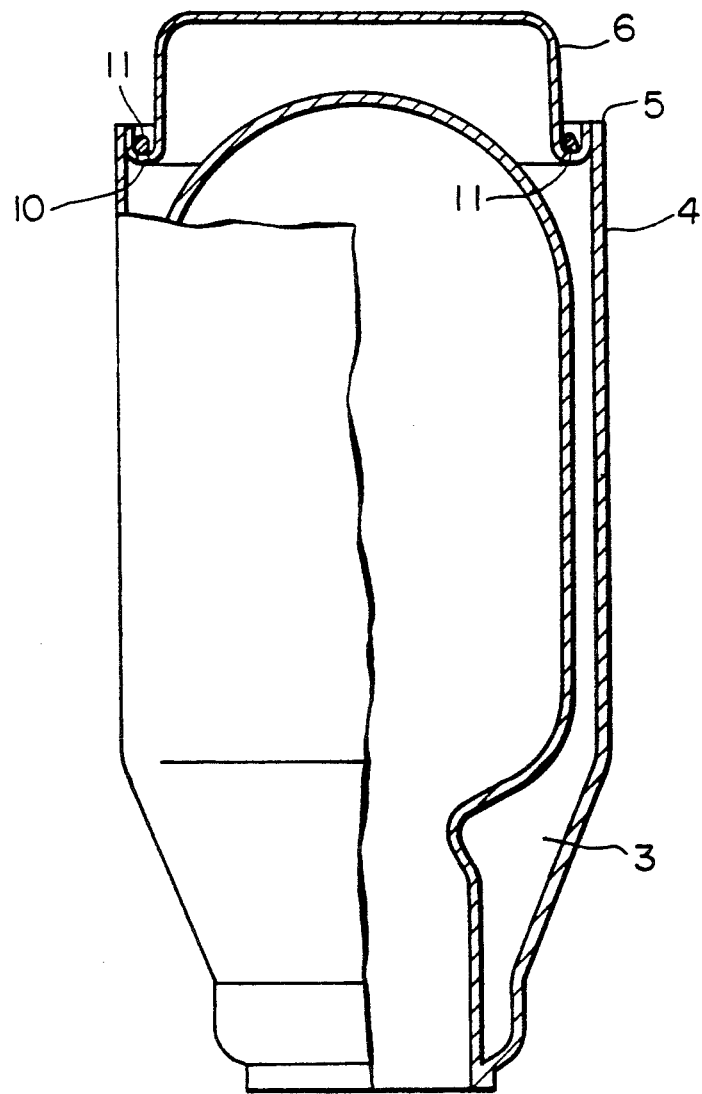
FIG. 23 is a schematic drawing to show the structural features of the metal thermos bottle in a seventh embodiment of claim 3.

FIG. 23 shows the fourth preferred embodiment of claim 3 of this invention, before vacuum sealing. In this example, a series of evacuation openings 10 is provided in the bottom area of a circular depression 9 disposed in the joint area between the bottom opening portion 5 and the bottom section 6, and a line of brazing material was placed along the depression to cover the openings 10.

Figure 24:
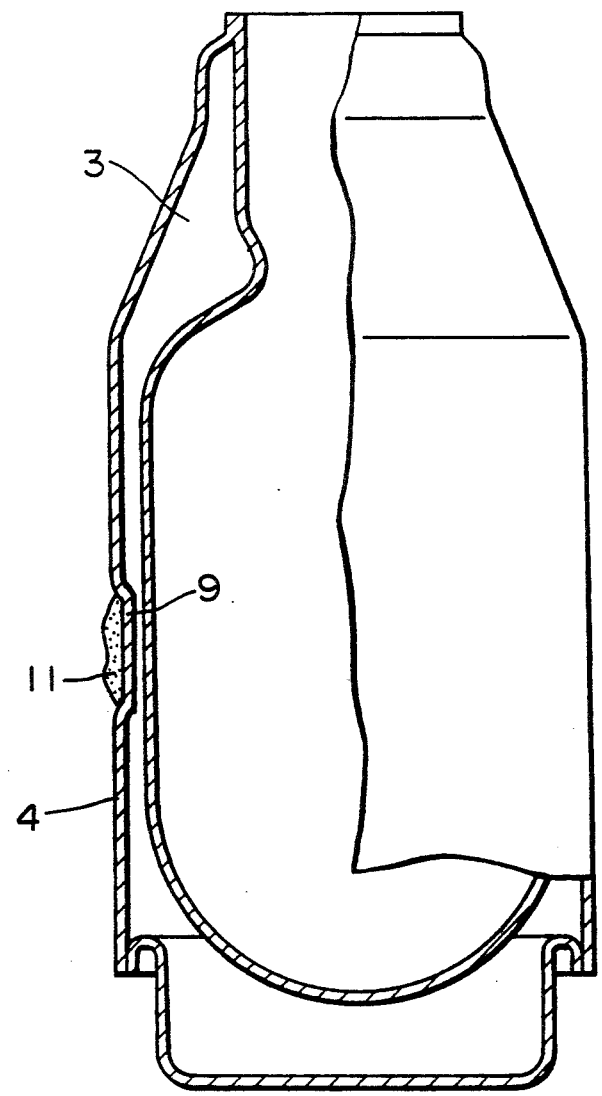
FIGS. 24 is a schematic drawing to show the structural features of the metal thermos bottle in a fifth embodiment of claim 3.
Figure 25:
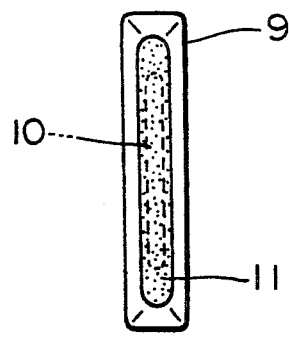
FIGS. 25 and 26 show enlarged views of the depressed section and the evacuation opening of the thermos bottle shown in FIG. 24.
Figure 26:
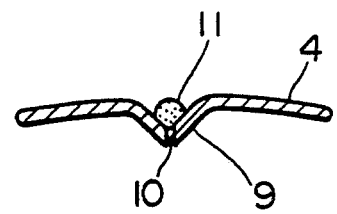

FIGS. 24 to 26 shows the fifth preferred embodiment of claim 3 of this invention before vacuum sealing. FIG. 24 shows the basic arrangement of the assembly, and FIGS. 25 and 26 show enlarged views of the placement of the brazing material. An evacuation opening is provided on the bottom of a V-shaped depression 9 (depression in the direction of the space 3) disposed on the body section 4 of the outer casing 2. This case differs from that shown in FIG. 10 in the complete covering of the opening 10 with a mound of brazing material 11. Brazing is carried out with the thermos assembly in a horizontal position. The length of the opening is not restricted to any extent, but a preferable width of the opening is in a range of 0.1 to 2.0 mm, as in the case of circular openings.

In this particular example, the evacuation opening 10 was provided on the central area of the body section 4, but if it is provided on the upper area of the shoulder section of the outer casing 2, there would be no need to invert or lay the assembly on its side during vacuum brazing.

In the cases presented in FIGS. 14 to 26, the evacuation opening 10 was located on the bottom area of a depression 9, but the usefulness of this invention is not limited to such cases. It is permissible to provide the opening 10 on the side walls of the depression 9.

Figure 27:
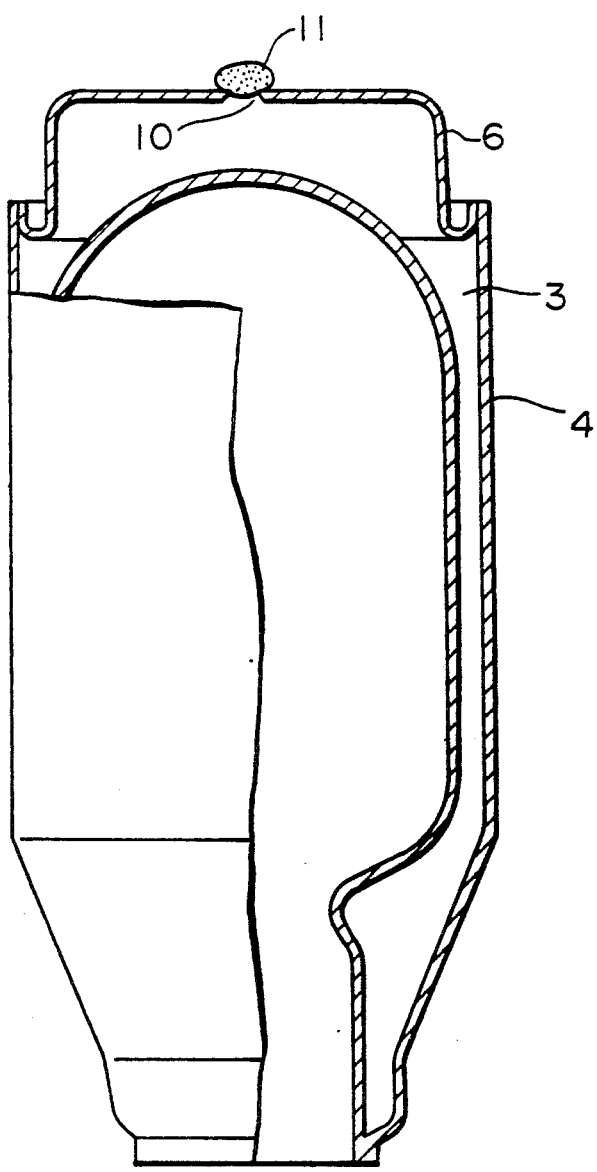
FIG. 27 is a schematic drawing to show the structural features of the metal thermos bottle in a sixth embodiment of claim 3.
Figure 28:
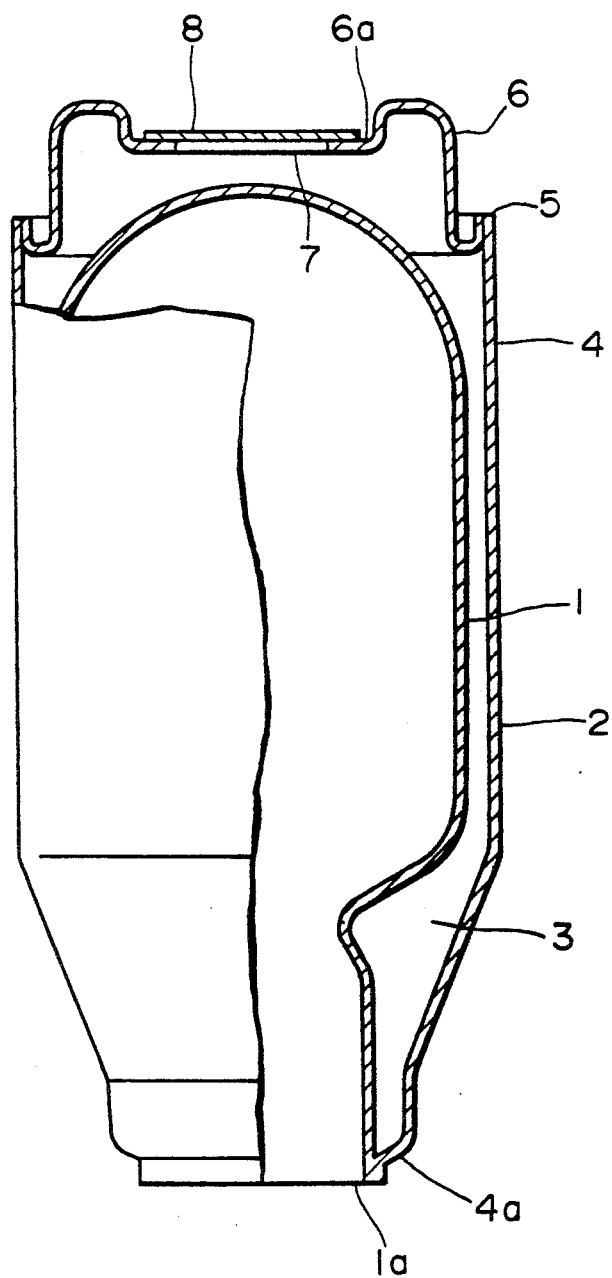
FIG. 28 is a schematic drawing to show the structural features of a conventional metal thermos bottle.

FIG. 27 shows the sixth preferred embodiment of claim 3 of this invention, before vacuum sealing. This case differs from the first preferred embodiment which was shown in FIGS. 14 to 16 in having the evacuation opening 10 directly on the bottom section 6 without the depression 9, and the sealing material 11 covers the opening completely, not partially as in the case of the first preferred embodiment shown in FIGS. 1 and 2. By eliminating the need for a depression, the manufacturing process can be further simplified.

According to the method presented above, an evacuated metal thermos bottle is produced by the following steps. A thermos bottle assembly having an inner and an outer casings, constituting a double-wall structure, is prepared wherein the outer casing has an evacuation opening for evacuating the space between the casings. A compounded brazing material, consisting substantially of a binder and brazing metal in a powder or particulate form, is placed to cover the opening. The assembly is then placed in a vacuum heating furnace to vaporize the binder, and the evacuation is continued to further evacuate the space in between the casings. When the space is evacuated, the thermos assembly is heated to higher temperatures to melt the brazing metal to seal off the evacuation opening. This method avoids the use the sealing plate, and permits efficient production of high quality thermos bottles.

According to the invented method, because the placement of the brazing material has been simplified, it is possible to automate the manufacturing process.

Further, according to the invented method, relatively a small amount (0.2 to 0.5 g) of brazing metal is needed to obtain good sealing because the conventional process required a large sealing plate and a large quantity (2 to 3 g) of brazing metal was needed seal a large contact area. Accordingly, the production cost can be lowered.

The substantive difference between the processes described in claims 1 and 2 on the one hand, and claims 3 and 4 on the other is discussed in the following.

The distinctive features of the claims 3 and 4 are in the special compounded brazing material, which consists of a binder and the brazing metal in a powder or particulate form, and in the vacuum brazing temperature. That is, evacuation of thermos assembly can be carried out in spite of complete covering of the evacuation opening with the brazing material. This has been made possible by the action of the invented compounded brazing material which consists of a vaporizable binder and brazing metal powder or particulates. When the temperature is maintained above the vaporizing temperature of the binder but below that of the melting point of the brazing metal, the binder vaporizes leaving behind a porous brazing body, through which evacuation can take place in spite of covering the entire opening with the brazing material. When the evacuation process is completed, the temperature of the vacuum heating furnace is raised to melt the porous braze to seal off the opening. Therefore, the processes claimed in claims 3 and 4 are able to produce high quality thermos bottles economically, because the method allows a more efficient use of the brazing metal as compared with the case of the method claimed in claims 1 and 2.

Example of Manufactured Product

A 1-litre stainless steel thermos bottle was produced according to the method described in claim 1. Its performance was tested as follows.

The bottle was filled with boiling hot water at 100° C., and was capped when the water temperature reached 95° C. After leaving the bottle for 24 hours at 20° C., the water temperature was 66° C. This result is identical to the performance of thermos bottles prepared by the conventional technique.

The brazing metal used in this demonstration was Ni-based (JIS BNi-2), the brazing was carried out at 1040° C. in a vacuum of $10^{-3}$ to $10^{-4}$ Torr and the size of the evacuation opening was $0.5 \times 8$ mm.

What is claimed is:

1. A method for making a thermally insulating metal container comprising the steps of:
   (a) preparing an inner casing having a mouth portion;
   (b) preparing an outer casing having a mouth portion, a bottom portion, and an evacuation opening of a given shape provided in the outer casing and having a length not exceeding a diameter at one end remote from the mouth portion of said outer casing;
   (c) joining the mouth portions of each casing to each other and fitting the bottom portion to the diameter of said one end of said outer casing thereby forming a container assembly, and defining an insulating space enclosed by the inner casing and the outer casing;
   (d) placing a quantity of a joining material near the evacuation opening so that said joining material upon melting will flow into the evacuation opening;
   (e) vacuum heating said assembly with the joining material disposed near the evacuation opening of said outer casing so as to vacuumize the insulating space;
   (f) raising a temperature of the joining material so as to liquify the joining material to cover and to seal the evacuation opening completely;
   (g) lowering the temperature of the joining material to solidify the joining material to seal off the evacuation opening; and
   (h) maintaining the shape of the evacuation opening substantially constant during the temperature raising step.

2. The method of making a thermally insulating metal container according to claim 1, wherein said joining material contains metal powder.

3. The method of making a thermally insulating metal container according to claim 1, wherein step (d) further comprises placing said joining material near the evacuation opening so as not to cover the evacuation opening completely.

4. The method of making a thermally insulating metal container according to claim 3, wherein said joining material contains metal powder.

5. The method of making a thermally insulating metal container according to claim 1, wherein step (d) further comprises placing said joining material near the evacuation opening so as to partially cover the evacuation opening.

6. The method of making a thermally insulating metal container according to claim 5, wherein said joining material contains metal powder.

7. A method of making a thermally insulating metal container comprising the steps of:
   (a) preparing an inner casing having a mouth portion;
   (b) preparing an outer casing having a mouth portion, a bottom portion, and an evacuation opening of a given shape provided in the outer casing and having a length not exceeding a diameter at one end remote from the mouth portion of said outer casing;
   (c) joining the mouth portions of each casing to each other and fitting the bottom portion to the diameter of said one end of said outer casing thereby forming a container assembly, and defining an insulating space enclosed by the inner casing and the outer casing;
   (d) placing a quantity of a compounded joining material consisting substantially of a binder and a joining material on the evacuation opening so as to completely cover the evacuation opening;
   (e) vacuum heating said assembly so as to vaporize the binder from the compounded joining material and to simultaneously vacuumize the insulating space;
   (f) raising a temperature of the compounded joining material so as to liquify the compounded joining material to cover and to seal the evacuation opening completely;
   (g) lowering the temperature of the compounded joining material to solidify the compounded joining material to seal off the evacuation opening; and
   (h) maintaining the shape of the evacuation opening substantially constant during the temperature raising step.

* * * * *

UNITED STATES PATENT AND TRADEMARK OFFICE
CERTIFICATE OF CORRECTION

PATENT NO. : 5,153,977
DATED : October 13, 1992
INVENTOR(S) : Shouji Toida, et al.

It is certified that error appears in the above-indentified patent and that said Letters Patent is hereby corrected as shown below:

```
Column 2, line 47, change "claim 3" to --claim 7--;
Column 2, line 56, change "claim 3" to --claim 7--;
Column 2, line 63, change "claim 3" to --claim 7--;
Column 2, line 68, change "claim 3" to --claim 7--;
Column 3, line 3, change "claim 3" to --claim 7--;
Column 3, line 9, change "claim 3" to --claim 7--;
Column 4, line 51, change "place" to --placed--;
Column 5, line 45, delete "as claimed in claim 4,";
Column 5, line 47, change "opening" to --depression--;
Column 5, line 54, change "claim 3" to --claim 7--;
Column 6, line 8, change "claim 3" to --claim 7--;
Column 7, line 33, change "claim 3" to --claim 7--;
Column 7, line 45, change "claim 3" to --claim 7--;
Column 7, line 52, change "claim 3" to --claim 7--;
Column 8, line 10, change "claim 3" to --claim 7--;
Column 8, line 46, change "claim" (second occurrence) to --claim--;
Column 8, line 47, change "3 and 4" to --7--;
Column 8, line 48, change "claims 3 and 4" to --claim 7--;
Column 8, line 67, change "claims 3 and 4" to --claim 7--.
```

Signed and Sealed this

Twenty-eighth Day of January, 1997

Attest:

BRUCE LEHMAN

Attesting Officer    Commissioner of Patents and Trademarks

REEXAMINATION CERTIFICATE (3582nd)
United States Patent [19]
Toida et al.

[11] B1 5,153,977
[45] Certificate Issued Jul. 28, 1998

[54] METHOD FOR MAKING DOUBLE-WALLED INSULATING METAL CONTAINER

[75] Inventors: Shouji Toida; Shigeru Tsuchiya; Keiki Ariga; Seiichi Itoh; Hidetoshi Ohta, all of Tokyo, Japan

[73] Assignee: Nippon Sanso Corporation, Tokyo, Japan

Reexamination Request:
No. 90/004,885, Dec. 30, 1997

Reexamination Certificate for:
Patent No.: 5,153,977
Issued: Oct. 13, 1992
Appl. No.: 649,484
Filed: Feb. 1, 1991

Certificate of Correction issued Jan. 28, 1997.

[51] Int. Cl.$^6$ .................................................. B23P 19/04
[52] U.S. Cl. ........................... 29/455.1; 29/422; 28/176
[58] Field of Search .................. 29/422, 455.1, 29/460, 773, 778, 801; 53/399, 440; 215/12.1, 12.2; 220/420–424, 456; 228/176, 184

[56] References Cited

U.S. PATENT DOCUMENTS

| | | |
|---|---|---|
| 1,504,088 | 8/1924 | Bransten . |
| 2,060,155 | 11/1936 | Wilhelm . |
| 2,133,492 | 10/1938 | Vatter . |
| 4,157,779 | 6/1979 | Ishii et al. . |
| 4,251,252 | 2/1981 | Frazier . |

FOREIGN PATENT DOCUMENTS

| | | |
|---|---|---|
| 59-117444 | 8/1984 | Japan . |
| 59-200616 | 11/1984 | Japan . |
| 60-12341 | 1/1985 | Japan . |
| 60-36766 | 8/1985 | Japan . |
| 62-178928 | 11/1987 | Japan . |
| 63-20128 | 4/1988 | Japan . |
| 63-20129 | 4/1988 | Japan . |
| 63-171530 | 7/1988 | Japan . |
| 6431048 | 2/1989 | Japan . |
| 6449519 | 2/1989 | Japan . |
| 6449520 | 2/1989 | Japan . |
| 6485619 | 3/1989 | Japan . |
| 6486920 | 3/1989 | Japan . |
| 159540 | 4/1989 | Japan . |
| 159541 | 4/1989 | Japan . |
| 159542 | 4/1989 | Japan . |
| 159543 | 4/1989 | Japan . |
| 162734 | 4/1989 | Japan . |
| 1113009 | 5/1989 | Japan . |
| 126692 | 5/1989 | Japan . |
| 1111543 | 7/1989 | Japan . |
| 139877 | 8/1989 | Japan . |
| 1157642 | 10/1989 | Japan . |
| 1268521 | 10/1989 | Japan . |
| 1297022 | 11/1989 | Japan . |
| 1303112 | 12/1989 | Japan . |
| 2189116 | 7/1990 | Japan . |
| 2195917 | 8/1990 | Japan . |
| 234612 | 8/1990 | Japan . |
| 255153 | 11/1990 | Japan . |
| 261358 | 12/1990 | Japan . |
| 414568 | 3/1992 | Japan . |
| 4114614 | 4/1992 | Japan . |
| 4200511 | 7/1992 | Japan . |
| 443648 | 7/1992 | Japan . |
| 443649 | 7/1992 | Japan . |
| 4112334 | 9/1992 | Japan . |

OTHER PUBLICATIONS

Encyclopedia of Chemical Technology, Kirk–Othmer, vol. 21; Published 1983; Chapter 21, pp. 342–355.

*Primary Examiner*—Peter Vo

[57] ABSTRACT

This invention relates to a method of making a double-walled thermally insulating metal container comprising an inner casing and an outer casing having an evacuation opening. A quantity of joining material is placed near or on the evacuation opening so as to cover the opening partially or completely. The assembly is treated in a vacuum furnace to evacuate the insulating space, to melt the joining material and to solidify the joining material in situ to provide vacuum sealing without resorting to a conventional sealing plate.

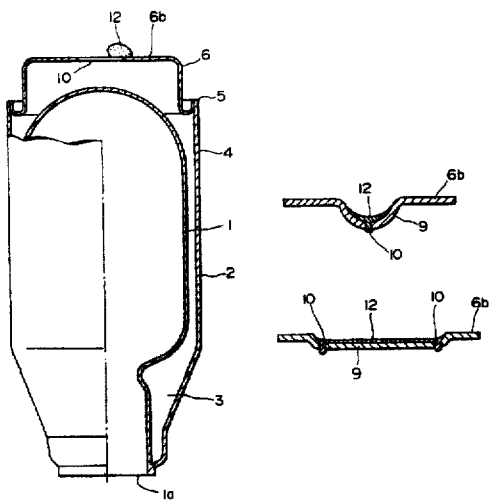

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *